United States Patent
Watanabe et al.

(10) Patent No.: US 7,531,580 B2
(45) Date of Patent: May 12, 2009

(54) PROCESS FOR PRODUCTION OF UV-CURABLE LIQUID POLYURETHANE RESIN

(75) Inventors: Tetsuya Watanabe, Kitaibaraki (JP); Takashi Chiba, Kitaibaraki (JP); Shuzo Yamada, Fujisawa (JP)

(73) Assignee: Unimatec Co., Ltd., Tokyo (JP)

( * ) Notice: Subject to any disclaimer, the term of this patent is extended or adjusted under 35 U.S.C. 154(b) by 138 days.

(21) Appl. No.: 10/552,236

(22) PCT Filed: Apr. 7, 2004

(86) PCT No.: PCT/JP2004/004986

§ 371 (c)(1),
(2), (4) Date: Oct. 7, 2005

(87) PCT Pub. No.: WO2004/091211

PCT Pub. Date: Oct. 21, 2004

(65) Prior Publication Data

US 2006/0194938 A1    Aug. 31, 2006

(30) Foreign Application Priority Data

Apr. 10, 2003 (JP) ............................ 2003-105981

(51) Int. Cl.
  *C08F 2/46* (2006.01)
  *C08F 2/50* (2006.01)
(52) U.S. Cl. ........................... 522/174; 522/90; 522/96; 522/182; 522/113; 522/114; 522/120; 522/119; 522/150; 522/151; 522/152; 522/173; 522/178; 522/181
(58) Field of Classification Search ............ 522/97, 522/90, 182, 113, 114, 119, 120, 121, 150, 522/151, 152, 173, 174, 178, 181, 183, 96
See application file for complete search history.

(56) References Cited

U.S. PATENT DOCUMENTS 5,945,463 A    8/1999    Kawabuchi et al.

FOREIGN PATENT DOCUMENTS

| JP | 63-165418 | 7/1988 |
|---|---|---|
| JP | 06-145276 | 5/1994 |
| JP | 08-041147 | 2/1996 |
| JP | 08-092342 | 4/1996 |
| JP | 08092342 A * | 4/1996 |
| JP | WO 96/10594 | 4/1996 |
| JP | A-2001-225392 | 8/2001 |
| JP | A-2003-105320 | 4/2003 |

OTHER PUBLICATIONS

Product Selection Guide for Powder Coatings. Ciba Speciality Chemicals. [online], [retrieved on Oct. 18, 2007]. Retrieved from the internet: <URL:hppt:www.cibasc.com/powder.pdf>.*

* cited by examiner

*Primary Examiner*—Sanza L McClendon
(74) *Attorney, Agent, or Firm*—Butzel Long

(57) ABSTRACT

(A) a polycarbonatediol, (B) a trifunctional alcohol, and (C) a diisocyanate are subjected to reaction in the presence of (D) a (meth)acrylate compound represented by the general formula $CH_2\!=\!CRCO(OC_nH_{2n})_pR'$ or $CH_2\!=\!CRCO(OC_mH_{2m})_q\,OCOCH\!=\!CH_2$, and (E) a di(meth)acrylate compound of alkylene glycol whose alkylene group is substituted as a lower alkyl group, and then (F) a hydroxyl group-containing (meth)acrylate is added to the resulting solution of urethane oligomers in (meth)acrylate to conduct terminal (meth)acrylating reaction of the urethane oligomers, thereby producing a UV-curable liquid polyurethane resin having a viscosity (25° C.) of preferably 150,000-1,000,000 mPa·s, where before or after the terminal (meth)acrylating reaction of the urethane oligomers (G) a photopolymerization initiator and (H) a hindered phenol-based antioxidant having a molecular weight of 500-2,000 are added thereto to form the UV-curable liquid polyurethane resin. The UV-curable liquid polyurethane resin can produce HDD gaskets, etc. in a cross-sectional shape with a good sealability by an automatic coating robot efficiently.

21 Claims, No Drawings

PROCESS FOR PRODUCTION OF UV-CURABLE LIQUID POLYURETHANE RESIN

TECHNICAL FIELD

The present invention relates to a process for producing a UV-curable liquid polyurethane resin, and more particularly to a process for producing a UV-curable liquid polyurethane resin, applicable to an automatic robot and suitable for use as molding materials for HDD gaskets, etc.

BACKGROUND ART

A gasket composition having a viscosity of 4,000-100,000 centipoises at 25° C., which comprises (A) an urethane acrylate oligomer having a weight average molecular weight Mw of 7,000-40,000, (B) monoacrylate of terminally substituted polyether or polyether-polyester, and (C) a photo-polymerization initiator, is disclose (WO96/10594), and it is states that gaskets for precision appliances can be made from the foregoing gasket composition simply by coating the composition by an automatic coating robot, followed by irradiation with ultraviolet rays with less generation of gas components, but in view of such a viscosity of the composition it would be hard to simply process gasket shapes requiring a high sealability. That is, due to such a low liquid viscosity, it would be impossible to obtain the necessary gasket cross-sectional height for fully attaining the required sealing performance.

To overcome the problem, processes for efficiently producing HDD gaskets having a chevron-shaped cross-section with a high sealability by an automatic coating robot from a photo-curable liquid material with an improved thixotropical property by addition of an inorganic filler have been proposed (JP-A-2001-225392 and JP-A-2003-105320). However, these processes would be inadequate for the production of HDD gaskets now requiring a high humidity barrier function due to the presence of the inorganic filler of highly hydrophilic property.

DISCLOSURE OF THE INVENTION

An object of the present invention is to provide a process for producing a UV-curable liquid polyurethane resin, which can produce HDD gaskets having a cross-sectional shape with a high sealability, etc., by an automatic coating robot efficiently.

The object of the present invention can be attained by a UV-curable liquid polyurethane resin having a viscosity (25° C.) of preferably 150,000-1,000,000 mPa·s, produced by subjecting (A) a polycarbonatediol having a molecular weight of 500-5,000, (B) a trifunctional alcohol, and (C) a diisocyanate compound to reaction in the presence of (D) a (meth)acrylate compound represented by the general formula $CH_2=CRCO(OC_nH_{2n})_pR'$ (where R is a hydrogen atom or a methyl group, R' is a hydrogen atom, an alkoxyl group or a phenoxy group, n is an integer of 1-12, and p is an integer of 1-5), or by the general formula $CH_2=CRCO(OC_mH_{2m})_qOCOCR=CH_2$ (where R is a hydrogen atom or a methyl group, m is an integer of 2-12, and q is an integer of 1-14), and (E) a di(meth)acrylate compound of alkylene glycol, whose alkylene group is substituted by a lower alkyl group, and by adding (F) a hydroxyl group-containing (meth)acrylate to the resulting solution of urethane oligomers in (meth)acrylate, thereby carrying out terminal (meth)acrylating reaction of the urethane oligomers, where before or after the terminal (meth)acrylating reaction of the urethane oligomers (G) a photopolymerization initiator and (H) a hindered phenol-based antioxidant having a molecular weight of 500-2,000 are added thereto, thereby forming a UV-curable liquid polyurethane resin. The term (meth)acrylate herein used means an acrylate or a methacrylate, and simultaneous use of these two is never inhibited.

In the production of a UV-curable liquid polyurethane resin, at first the aforementioned components (A), (B), and (C) are subjected to reaction in the presence of the aforementioned components (D) and (E) to prepare a solution of urethane oligomers in (meth)acrylate.

Polycarbonatediol for use as Component (A) includes compounds having at least two carbonate structures in the molecule and having a molecular weight of 500-5,000, preferably 1,000-3,000, for example, products obtained by polycondensation reaction between a diol such as 1,4-butanediol, 1,6-hexanediol, neopentyl glycol, 1,8-octanediol, 1,9-nonanediol, 1,4-cyclohexane dimethanol, 2-methylpropanediol, dipropylene glycol, diethylene glycol, etc., or reaction products of these diol with a dicarboxylic acid such as oxalic acid, malonic acid, succinic acid, adipic acid, azelaic acid, hexahydrophthalic acid, etc., and an aromatic or aliphatic carbonate such as diphenyl carbonate, bis(chlorophenyl) carbonate, dinaphthyl carbonate, phenyl toluyl carbonate, phenyl chlorophenyl carbonate, 2-tolyl-4-tolyl carbonate, dimethyl carbonate, diethyl carbonate, diethylene carbonate, ethylene carbonate, etc., typically compounds represented by the following general formula:

or products obtained by transesterification reaction between an alkylene carbonate $(R'O)_2CO$ and an alkylene glycol HOROH, typically compounds represented by the following general formula:

When the molecular weight is less than 500, no appropriate rubber elasticity for the gasket materials is obtained, whereas when the molecular weight is more than 5,000, no satisfactory rubber strength is obtained.

Trifunctional alcohol for use as Component (B) has a molecular weight of 100-2,000, preferably 122-1,000, and includes, for example, trimethylolpropane (n=0) or propene oxide adducts thereof represented by the following general formula:

Other alkylene oxide adducts such as ethylene oxide adducts of trimethylolpropane, etc. can be used as well. When no trifunctional alcohol is used, gasket processability (such as liquid sagging after coating, and tackiness after curing) or compression set characteristics will be deteriorated, as shown by the results in Comparative Example 1.

Diisocyanate compound for use as Component (C) is preferably an aromatic diisocyanate such as 4,4'-diphenylmethane diisocyante (MDI), polymeric MDI, tolylene diisocyanate, toluene diisocyanate, tolidine diisocyanate, p-phenylene diisocyanate, naphthalene dii-socyanate, etc. Aliphatic diisocyanates are less reactive than the aromatic diisocyanates and are liable to remain as an unreacted component after the reaction, and thus are not preferable as diisocyanate compounds.

These Components (A), (B) and (C) can form urethane oligomers, and are used in a proportion of about 0.5 to about 10 parts by weight, preferably about 1 to about 8 parts by weight, of Component (B) and about 20 to about 60 parts by weight, preferably about 25 to about 50 parts by weight, of Components (C) on the basis of 100 parts by weight of Component (A), and in NCO/OH equivalent ratio of 1.01-2.00, preferably 1.05-1.12.

Urethane oligomer formation reaction is carried out at about 40° to about 120° C., preferably about 800 to about 100° C., preferably in the presence of Components (D) and (E).

(Meth)acrylate compound for use as Component (D) includes, for example, methyl acrylate, ethyl acrylate, n-butyl acrylate, 2-ethyhexyl acrylate, n-octyl acrylate, 2-ethoxyethyl acrylate, 2-phenoxyethyl acrylate, and corresponding methacrylates thereto, among which 2-ethylhexyl acrylate is preferable. Diethylene glycol di(meth)acrylate, etc. can be used as well. These (meth)acrylate compounds act as a solvent in the urethane oligomerization reaction, and also act to lower the glass transition points of the cured products and reduce the polarity (hydrophilic property). Component (D) is used in a proportion of about 10 to about 200 parts by weight, preferably about 20 to about 100 parts by weight, on the basis of 100 parts by weight of Component (A).

Di(meth)acrylate compound of alkylene glycol, whose alkylene group is substituted by a lower alkyl group, for use as Component (E) includes di(meth)acrylates of alkylene glycol, where the alkylene group of alkylene glycol having 4-12 carbon atoms, such as 1,4-butanediol, 1,6-hexanediol, 1,8-octanediol, 1,9-nonanediol, etc. is mono- or di-substituted with a lower alkyl group having 1-5 carbon atoms, for example, 2,2-di(lower alkyl) -1,3-propanediol di(meth)acrylate, preferably 2-butyl-2-ethyl-1,3-propanediol diacrylate, 2,2-dimethyl-1,3-propanediol (neopentyl glycol) di(meth)acrylate, etc. with less increase in the hardness and water absorbability. Component (E) acts not only as a solvent in the oligomerization reaction, but also can improve the curing reactivity during the UV irradiation and the characteristics of UV-cured products. When no Component (E) is used, the tensile strength and compression set characteristics will be lowered, and the tackiness will still appear even after the curing, as shown by results in Comparative Example 6. Component (E) is used in a proportion of about 1 to about 20 parts by weight, preferably about 2 to about 15 parts by weight, on the basis of 100 parts by weight of Component (A). On the other hand, ethylene oxide-based di(meth)acrylates, such as triethylene glycol di(meth)acrylate, have a high polarity and are not adequate for use for a high humidity barrier function.

Both Components (D) and (E) take no part in the urethane oligomer synthesis reaction directly, and thus may be added thereto after the urethane oligomer synthesis. However, in the urethane oligomer synthesis reaction, the viscosity is considerably increased in progress of polymerization (increasing to high molecular weight), so the necessary stirring and mixing for uniformly carrying out the reaction will be hard to conduct. Thus, it is practical to add, before the urethane oligomer synthesis reaction, Components (D) and (E), which take no part in the urethane oligomer synthesis reaction, but must be added thereto to ultimately act as diluents, thereby conducting the urethane oligomer synthesis reaction in solution in the diluents.

The aforementioned Component (F) is added to the solution of urethane oligomers in (meth)acrylate obtained from Components (A) to (E), whereby terminal (meth)acrylating reaction of urethane oligomers is carried out by Component (F) at about 40° to about 120° C., preferably about 80° to about 100° C.

Hydroxyl group-containing (meth)acrylate for use as Component (F) includes hydroxyalkyl (meth)acrylates having a molecular weight of 100-400, such as 2-hydroxyethyl acrylate, 2-hydroxyethyl methacrylate, 2-hydroxypropyl acrylate, etc. The hydroxyl group-containing (meth)acrylate is used so that its hydroxyl group can react with the terminal isocyanate groups of urethane oligomers, thereby urethanizing the molecular chain terminals of urethane oligomers and introducing the (meth)acrylate group thereto. Unless the hydroxyl group-containing (meth)acrylate is used, UV curing will be unsatisfactory, as will be shown by the results in Comparative Example 7. The hydroxyl group-containing (meth)acrylate is used in a proportion of 0.01-0.90 in terms of NCO/OH equivalent ratio with respect to the terminal isocyanate group in the resulting urethane oligomers.

Photopolymerization initiator for use as Component (G) includes usually used benzoin alkyl ether-based, acetophenone-based, propiophenone-based, anthraqui-none-based, thioxanthone-based photopolymerization initiators, etc. such as 1-hydroxycyclohexyl phenyl ketone, benzoin ether, benzyl dimethyl ketal, α-hydroxyalkylphenone, α-aminoalkylphenone, bisacylphosphine oxide, etc. The photopolymerization initiator is used in a proportion of about 0.1 to about 10 parts by weight on the basis of 100 parts by weight of the urethane acrylate oligomers thus formed. A rather small amount of sensitizer can be used at the same time, if required.

Hindered phenol-based antioxidant for use as Component (H) includes those having a molecular weight of 500-2,000, such as pentaerythrytyl tetrakis [3-(3,5-di-t-butyl-4-hydroxyphenyl)propionate], 1,6-hexanediol bis[3-(3,5-di-t-butyl-4-hydroxyphenyl)propionate], triethylene glycol bis[3-(3-t-butyl-5-methyl-4-hydroxyphenyl)propionate], etc. Commercially available products such as Irganox 1010, Irganox 1076, (products made by Ciba Speciality Chemicals), etc. can be used directly, so far as they have molecular weight within the aforementioned range. The antioxidant with a molecular weight of less than 500 acts as a gas-generating component by itself and thus is unsuitable for use in precision appliance parts such as HDD, whereas the antioxidant with a molecular weight of more than 2,000 has a poor solubility in liquid polyurethane resin and thus fails to attain a satisfactory antioxidant effect. The antioxidant is used in a proportion of about 0.1 to about 10 parts by weight, preferably about 1 to about 5 parts by weight, on the basis of 100 parts by weight of the resulting urethane acrylate oligomers.

The photopolymerization initiator as Component (G) and the hindered phenol-based antioxidant as Component (H) can be added before or after terminal (meth)acrylating reaction of urethane oligomers, or one of Component (G) and (H) can be added before the reaction, whereas the other can be added after the reaction. However, the resulting TV-curable liquid polyurethane resin has a very high viscosity after the terminal (meth)acrylating reaction of urethane oligomers, and thus it is preferable to add Components (G) and (H) before the terminal (meth)acrylating reaction.

The UV-curable liquid polyurethane resin resulting from the terminal (meth)acrylating reaction of urethane oligomers is adjusted to a viscosity (25° C.) of 150,000-1,000,000 mPa·s, preferably 170,000-800,000 mPa·s. Adjustment to such a viscosity can be made by:

(1) adjusting a ratio of urethane oligomers to Component (D) (meth)acrylate compound as a reactive diluent (see Comparative Example 2), (2) selecting the molecular weight of urethane oligomers themselves, (3) selecting the structure of urethane oligomers (see Comparative Example 5), or (4) selecting the structure (species) of Component (D) meth(acrylate) compound as a reactive diluent.

The liquid polyurethane resin having a viscosity of more than 1,000,000 mPa·s has a poor dischargeability (processing efficiency), where-as the resin having a viscosity of less than 150,000 mPa·s shows not only a liquid sagging, but also difficult molding into the desired chevron-shaped cross-section.

The present UV-curable liquid polyurethane resin having such a high viscosity can be made into gaskets by coating the resin to a substrate such as a metal sheet, etc. at a temperature of about 30° to about 80° C., preferably 40° to 80° C., by an automatic coating robot, for example, an X-Y-Z axis coating robot, followed by ultraviolet (UV) ray irradiation to conduct curing reaction, and by a high temperature treatment at about 100° to about 180° C. The ultraviolet ray source includes a xenon lamp, a low pressure mercury lamp, a high pressure mercury lamp, an ultrahigh pressure mercury lamp, etc. Ultraviolet ray irradiation conditions depend on irradiation apparatuses to be used, and generally an irradiation dose of about 1,000 to about 10,000 mJ/cm$^2$ and irradiation time of about 10 seconds to about 5 minutes. Ultraviolet ray irradiation is carried out in an atmosphere at a reduced oxygen concentration, such as an inert gas atmosphere, an air atmosphere, etc.

BEST MODES FOR CARRYING OUT THE INVENTION

The present invention will be described in detail below, referring to Examples.

EXAMPLE 1

100 parts by weight of polycarbonatediol (Kurare Polyol C-1015N, a product made by Kuraray Co., Ltd, average molecular weight: about 1,000), 1.3 parts by weight of propylene oxide adduct of methylolpropane represented by the foregoing general formula (molecular weight: 400), 93.2 parts by weight of 2-ethylhexyl acrylate, and 5.0 parts by weight of 2-butyl-2-ethyl-1,3-propanediol diacrylate were charged into a 4-necked flask provided with a stirrer, a condenser, and a thermometer, and heated up to 80° C., and then 31.3 parts by weight of 4,4'-diphenylmethane diisocyanate (NCO/OH equivalent ratio=1.2) was added thereto to conduct urethanization reaction at 80° to 100° C. for 60 minutes, thereby obtaining a solution of urethane oligomers in acrylate.

Then, 9.7 parts by weight of 2-hydroxyethyl acrylate (NCO/OH equivalent ratio with respect to terminal isocyanate groups of the resulting urethane oligomers), 2.5 parts by weight of 1-hydroxycyclohexyl phenyl ketone, and 2.5 parts by weight of a hindered phenol-based antioxidant (Irganox 1010, a product made by Ciba Speciality Chemicals) were added to the resulting solution of urethane oligomers in acrylate to conduct terminal acrylating reaction of urethane oligomers at 80° to 100° C. for 60 minutes, thereby obtaining UV-curable liquid polyurethane resin A.

EXAMPLE 2

In Example 1, 93.2 parts by weight of phenoxyethyl acrylate was used in place of 2-ethylhexyl acrylate to obtain UV-curable liquid polyurethane resin B.

COMPARATIVE EXAMPLE 1

In Example 1, the amount of 2-ethylhexyl acrylate was changed to 88.1 parts by weight, that of 2-butyl-2-ethyl-1,3-propanediol diacrylate to 4.6 parts by weight, and that of 4,4'-diphenylmethane diisocyanate to 26.3 parts by weight without using the trimethylolpropane derivative, whereby a solution of urethane oligomers in acrylate was obtained.

Then, 8.2 parts by weight of 2-hydroxyethyl acrylate, 2.3 parts by weight of 1-hydroxycyclohexyl phenyl ketone, and 2.3 parts by weight of a hindered phenol-based antioxidant (Irganox 1010) were added to the resulting solution of urethane oligomers in acrtylate to conduct terminal acrylating reaction at 80° to 100° C. for 60 minutes, thereby obtaining UV-curable liquid polyurethane resin C.

COMPARATIVE EXAMPLE 2

In Example 1, the amount of 2-ethylhexyl acrylate was changed to 44.3 parts by weight, and that of 2-butyl-2-ethyl-1,3-propanediol diacrylate to 4.0 parts by weight, whereby a solution of urethane oligomers in acrylate was obtained.

Then, 8.0 parts by weight of 2-hydroxyethyl acrylate, 2.0 parts by weight of 1-hydroxycyclohexyl phenyl ketone, and 2.0 parts by weight of a hindered phenol-based antioxidant (Irganox 1010) were added to the resulting solution of urethane oligomers in acrylate to conduct terminal acrylating reaction of urethane oligomers at 80° to 100° C. for 60 minutes, thereby obtaining UV-curable liquid polyurethane resin D.

COMPARATIVE EXAMPLE 3

In Example 1, no hindered phenol-based antioxidant was used, whereby UV-curable liquid polyurethane resin E was obtained.

COMPARATIVE EXAMPLE 4

In Example 1, 2.5 parts by weight of a hindered phenol-based anti-oxidant of low molecular weight type (Irganox 1135, a product made by Ciba Speciality Chemicals, molecular weight: about 400) was used, where-by UV-curable liquid polyurethane resin F was obtained.

COMPARATIVE EXAMPLE 5

In Example 1, the same amount of polyesterpolyol (Kurare Polyol P-1010, average molecular weight: about 1,000) derived from 3-methyl-1,5-pentanediol and adipic acid was used in place of polycarbonatediol, where-by UV-curable liquid polyurethane resin G was obtained.

COMPARATIVE EXAMPLE 6

In Example 1, no 2-butyl-2-ethyl-1,3-propanediol diacrylate was used, whereby UV-curable liquid polyurethane resin H was obtained.

COMPARATIVE EXAMPLE 7

In Example 1, no 2-hydroxyethyl acrylate was used, whereby UV-curable liquid polyurethane resin I was obtained.

UV-curable liquid polyurethane resins A to I obtained in the foregoing Examples and Comparative Examples were poured into individual glass molds, then immediately subjected to ultraviolet ray irradiation at an irradiation dose of 8000 mJ/cm$^2$ for 2-3 minutes, and then to a high temperature treatment at 150° C. for 7 hours to obtain individual sheets (2 mm thick) for evaluation of hardness, tensile characteristics, compression set, water absorbability and amount of generated gas.

Hardness and tensile characteristics: according to JIS K6253 and JIS K6251

Compression set: according to JIS K6262

Water absorbability: by dipping into water at room temperature for 24 hours and measuring the resulting weight increment Amount of generated gas: by subjecting about 1.5 g of a test piece cut into a strip shape to heat extraction at 110° C. for 18 hours according to a dynamic head space method to measure an amount of generated gas by GC/MS UV-curable liquid polyurethane resins A to I were each coated to individual rectangular aluminum sheets (70×100 mm) along the in-sides of 4 peripheral edges under such conditions as discharge pressure: 100 kPa and graphic-plotting speed: 40 mm/sec while heating the resin at 60° C., using an automatic coating robot in connection to a nozzle, 1.43 mm in inner diameter so as to bring the plotted graphic linear gasket-shaped trace into a chevron-shaped cross-section, immediately followed by ultra-violet ray irradiation at an irradiation dose of 8,000 mJ/cm$^2$ for an irradiation time of 15 seconds and a high temperature treatment at 150° C. for 7 hours, thereby obtaining dummy gasket covers.

Evaluation was made as to dischargeability showing a processing efficiency (where mark ○ shows a good dischargeability, whereas mark X a poor dischargeability), occurrence of liquid sagging after the application, tackiness after the curing (where mark ○ shows no observation of any tacky state, X observation of some tacky state, and XX observation of a heavy tacky state), gasket shape (height/width ratio) after the processing and curing.

The results are shown in the following Table.

gaskets with a high height/width ratio and a chevron-shaped cross-section of considerable height, more specifically gaskets in a chevron-shaped cross-section, having about 0.5 to about 3.0 mm wide at the part in contact with a metal substrate, and about 0.5 to about 2.0 mm height above the metal substrate surface in a height/width ratio of about 0.5 to about 2.0, in other words, gaskets with a high sealability, can be obtained.

The UV-curable liquid polyurethane resin having such a composition has a high adhesiveness to a metal oxide film-overlaid metal substrate owing to the presence of the appropriate polar group of mono (meth)acrylate in a specific structure as a reactive diluent component, and thus a strong bonding force can be obtained only by direct coating to a metal substrate and UV ray irradiation without any chromate

TABLE

|  | Ex. No. | | Comp. Ex. No. | | | | | |
| --- | --- | --- | --- | --- | --- | --- | --- | --- |
|  | 1 | 2 | 1 | 2 | 3 | 4 | 5 | 6 |
| [UV-curable liquid polyurethane resin] | | | | | | | | |
| Species | A | B | C | D | E | F | G | H |
| Trifunctional alcohol | yes | yes | none | yes | yes | yes | yes | yes |
| Diacrylate | yes | yes | yes | yes | yes | yes | yes | none |
| Antioxidant | yes | yes | yes | yes | none | (yes) | yes | yes |
| [Material characteristics] | | | | | | | | |
| Hardness | 40 | 48 | 35 | 38 | 38 | 39 | 32 | 33 |
| (Durometer A, after 15 seconds) | | | | | | | | |
| Tensile strength (MPa) | 0.65 | 1.50 | 0.48 | 0.73 | 0.44 | 0.60 | 0.53 | 0.39 |
| Elongation at break (%) | 200 | 300 | 220 | 270 | 160 | 190 | 220 | 280 |
| Water absorbability (%) | 0.30 | 0.31 | 0.30 | 0.32 | 0.31 | 0.31 | 0.52 | 0.33 |
| Amount of generated gas by heating (μ g/g) | 25 | 23 | 31 | 22 | 116 | 82 | 27 | 22 |
| Compression set (%) | 15 | 30 | 28 | 13 | 16 | 15 | 13 | 31 |
| [Gasket processability] | | | | | | | | |
| Liquid viscosity at 25° C. (×10$^4$ mPa·s) | 40 | 55 | 11 | 150 | 40 | 40 | 5 | 40 |
| Dischargeability (processing efficiency) | ○ | Δ | ○ | X | ○ | ○ | ○ | ○ |
| Liquid sagging after application | none | none | slightly | none | none | none | yes | none |
| Tackiness after curing | ○ | ○ | X | ○ | ○ | ○ | ○ | X |
| Gasket shape | | | | | | | | |
| Height (mm) | 1.2 | 1.3 | 0.9 | 1.6 | 1.2 | 1.2 | 0.7 | 1.2 |
| Width (mm) | 2.0 | 1.8 | 2.3 | 1.8 | 2.0 | 2.0 | 2.4 | 2.0 |
| Height/width ratio | 0.60 | 0.72 | 0.39 | 0.88 | 0.60 | 0.60 | 0.29 | 0.60 |

In the case of UV-curable liquid polyurethane resin I of Comparative Example 7 without terminal acrylation, the liquid viscosity at 25° C. was 40×10$^4$ mPa·s, the dischargeability (processing efficiency) showed ○, liquid sagging after the application showed none, and the tackiness showed XX, but the curing by UV ray irradiation was found to be not satisfactory, so the characteristics after the curing were impossible to determine.

INDUSTRIAL UTILITY

The present UV-curable liquid polyurethane resin can produce a chevron-shaped cross-section with a sufficient height by coating to metallic sheets etc. at elevated temperatures by using an automatic coating robot, while maintaining the high chevron-shaped cross-section just after the coating without any liquid sagging even in a high temperature atmosphere in the curing step using a UV irradiation lamp. As a result, treatment, etc. to the metal substrate, particularly stainless steel sheet, or without any special step such as an adhesive application treatment or primer application treatment to the surface to be coated.

Furthermore, the resulting gaskets show a low water absorbability and a high humidity barrier function owing to a high intermolecular cohesion force due to the polycarbonate structure, and also have a distinguished heat resistance, which can be further improved particularly by adding an antioxidant of specific structure thereto. That is, only unreacted low molecular weight components can be removed even by a high temperature treatment without any thermal decomposition, and the resulting low-outgassing gaskets can be made suitable for use in precision appliances for HDD, etc.

The invention claimed is:
1. A process for producing a gasket molding material applicable to an automatic coating robot, consisting of a UV- curable liquid polyurethane resin having a viscosity (25°) of 150,000-1,000,000 mPa·s, which comprises subjecting (A) a polycarbonatediol having a molecular weight of 500-5,000, (B) a trifunctional alcohol, and (C) a diisocyanate to reaction in the presence of (D) a (meth)acrylate compound represented by the general formula $CH_2=CRCO(OC_nH_{2n})_pR'$ (where R is a hydrogen atom or a methyl group, R' is a hydrogen atom, an alkoxyl group, or a phenoxy group, n is an integer of 1-12, and p is an integer of 1-5), or the general formula $CH_2=CRCO(OC_mH_{2m})_qOCOCR=CH_2$ (where R is a hydrogen atom or a methyl group, m is an integer of 2-12, and q is an integer of 1-14), and (E) a di(meth)acrylate compound of alkylene glycol whose alkylene group is substituted by a lower alkyl group having 1 to 5 carbon atoms, and by adding (F) a hydroxyl group-containing (meth)acrylate to the resulting solution of urethane oligomers in (meth)acrylate, thereby carrying out terminal (meth)acrylating reaction of the urethane oligomers.

2. A process for producing a gasket molding material according to claim 1, wherein the terminal (meth)acrylating reaction is carried out after adding (G) a photopolymerization initiator and (H) a hindered phenol-based antioxidant having a molecular weight of 500-2,000 thereto.

3. A process for producing a gasket molding material according to claim 1, wherein after the terminal (meth)acrylating reaction of the urethane oligomers is carried out, (G) a photopolymerization initiator and (H) a hindered phenol-based antioxidant having a molecular weight of 500-2,000 are added to the reaction mixture.

4. A process for producing a gasket molding material according to claim 1, wherein the trifunctional alcohol as Component (B) is trimethylolpropane or an alkylene oxide adduct thereof.

5. A process for producing a gasket molding material according to claim 1, wherein the trifunctional alcohol as Component (B) is used in a proportion of 0.5-10 parts by weight on the basis of 100 parts by weight of the polycarbonatediol as Component (A).

6. A process for producing a gasket molding material according to claim 1, wherein the diisocyanate as Component (C) is an aromatic diisocyanate.

7. A process for producing a gasket molding material according to claim 1, wherein the diisocyanate as Component (C) is used in a proportion of 20-60 parts by weight on the basis of 100 parts by weight of the polycarbonatediol as Component (A) and in NCO/OH equivalent ratio of 1.01-2.00.

8. A process for producing a gasket molding material according to claim 1, wherein the (meth)acrylate compound as Component (D) is used in a proportion of 10-200 parts by weight on the basis of 100 parts by weight of the polycarbonatediol as Component (A).

9. A process for producing a gasket molding material according to claim 1, wherein Component (E) is 2,2-di(lower alkyl)-1,3-propanediol di(meth)acrylate.

10. A process for producing a gasket molding material according to claim 1, wherein the lower alkyl-substituted alklene glycol di(meth)acrylate compound as Component (E) is used in a proportion of 1-20 parts by weight on the basis of 100 parts by weight of the polycarbonatediol as Component (A).

11. A process for producing a gasket molding material according to claim 1, wherein the hydroxyl group-containing (meth)acrylate as Component (F) is used in NCO/OH equivalent ratio of 0.01-0.90 with respect to the terminal isocyanate groups of the resulting urethane oligomers.

12. A process for producing a gasket molding material according to claim 2, wherein the photopolymerization initiator as Component (G) is used in a proportion of 0.1-10 parts by weight on the basis of 100 parts by weight of the resulting urethane acrylate oligomers.

13. A process for producing a gasket molding material according to claim 2, wherein the hindered phenol-based antioxidant as Component (H) is used in a proportional of 0.1-10 parts by weight on the basis of 100 parts by weight of the resulting urethane acrylate oligomers.

14. An HDD gasket molding material that comprises the gasket molding material of claim 1.

15. A process for producing a gasket which comprises coating the UV-curable liquid polyurethane resin of claim 1 on a substrate at a temperature of 30° C. to 80° C., followed by ultraviolet ray irradiation to cause curing reaction and by a high temperature treatment at 100° C. to 180° C.

16. A process for producing a gasket molding material according to claim 4, wherein the trifunctional alcohol as Component (B) is used in a proportion of 0.5-10 parts by weight on the basis of 100 parts by weight of the polycarbonatediol as Component (A).

17. A process for producing a gasket molding material according to claim 6, wherein the diisocyanate as Component (C) is used in a proportion of 20-60 parts by weight on the basis of 100 parts by weight of the polycarbonatediol as Component (A) and in NCO/OH equivalent ratio of 1.01-2.00.

18. A process for producing a gasket molding material according to claim 9, wherein the lower alkyl-substituted alklene glycol di(meth)acrylate compound as Component (E) is used in a proportion of 1-20 parts by weight on the basis of 100 parts by weight of the polycarbonatediol as Component (A).

19. A method of producing a HDD gasket according to claim 14 using an automatic coating robot to apply the HDD gasket molding material.

20. A process for producing a gasket molding material according to claim 1, wherein the terminal (meth)acrylating reaction of the urethane oligomers is carried out after adding (G) a photopolymerization initiator, and (H) a hindered phenol-based antioxidant having a molecular weight of 500-2,000 is added thereto after the reaction is carried out.

21. A process for producing a gasket molding material according to claim 1, wherein the terminal (meth)acrylating reaction of the urethane oligomers is carried out after adding (H) a hindered phenol-based antioxidant having a molecular weigh of 500-2,000, and (G) a photopolymerization initiator is added thereto after the reaction is carried out.

* * * * *

UNITED STATES PATENT AND TRADEMARK OFFICE
CERTIFICATE OF CORRECTION

PATENT NO. : 7,531,580 B2  Page 1 of 1
APPLICATION NO. : 10/552236
DATED : May 12, 2009
INVENTOR(S) : Tetsuya Watanabe, Takashi Chiba and Shuzo Yamada It is certified that error appears in the above-identified patent and that said Letters Patent is hereby corrected as shown below:

On the Title Page

In column 1, item (87), delete "WO2004/091211" and substitute --WO2004/090010-- in its place.

Signed and Sealed this

Twenty-second Day of December, 2009

David J. Kappos
*Director of the United States Patent and Trademark Office*

UNITED STATES PATENT AND TRADEMARK OFFICE
CERTIFICATE OF CORRECTION

PATENT NO.       : 7,531,580 B2
APPLICATION NO.  : 10/552236
DATED            : May 12, 2009
INVENTOR(S)      : Tetsuya Watanabe, Takashi Chiba and Shuzo Yamada It is certified that error appears in the above-identified patent and that said Letters Patent is hereby corrected as shown below:

On the Title Page

Item (73), delete "Unimatec Co., Ltd., Tokyo (JP)" and substitute -- Unimatec Co., Ltd., Tokyo, (JP) and NOK Corporation, Tokyo (JP) -- in its place.

Signed and Sealed this

Twenty-ninth Day of June, 2010

David J. Kappos
*Director of the United States Patent and Trademark Office*